United States Patent
Patel et al.

(10) Patent No.: US 10,112,554 B2
(45) Date of Patent: Oct. 30, 2018

(54) VEHICLE TRIM PANEL RETAINER

(71) Applicant: FORD GLOBAL TECHNOLOGIES, LLC, Dearborn, MI (US)

(72) Inventors: Deepak Patel, Canton, MI (US); Satyanarayana Raju Vemulapati, Westland, MI (US); Zhibing Deng, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 15/252,983

(22) Filed: Aug. 31, 2016

(65) Prior Publication Data
US 2018/0056892 A1    Mar. 1, 2018

(51) Int. Cl.
  *B60R 13/02*    (2006.01)
(52) U.S. Cl.
  CPC ...... *B60R 13/0206* (2013.01); *B60R 13/0243* (2013.01); *B60R 2013/0287* (2013.01)
(58) Field of Classification Search
  CPC ............ B60R 13/0206; B60R 13/0243; B60R 2013/0287
  USPC ...................................................... 296/146.7
  See application file for complete search history.

(56) References Cited

U.S. PATENT DOCUMENTS

| 7,669,915 | B2 * | 3/2010 | Lipski ................. B60R 13/0243 296/1.08 |
| 8,517,442 | B1 * | 8/2013 | Agnew ............... B60R 13/0206 24/289 |
| 8,733,820 | B2 | 5/2014 | Vemulapati et al. |
| 2009/0134659 | A1 | 5/2009 | Hall et al. |
| 2009/0183436 | A1 | 7/2009 | Dry |

FOREIGN PATENT DOCUMENTS

| JP | 3989632 B2 | 10/2007 |
| JP | 5125545 B2 | 1/2013 |
| KR | 20010060525 A | 7/2001 |
| KR | 20100090567 A | 8/2010 |

OTHER PUBLICATIONS

English Machine Translation of JP3989632B2.
English Machine Translation of JP5125545B2.
English Machine Translation of KR20010060525A.
English Machine Translation of KR20100090567A.

* cited by examiner

*Primary Examiner* — Joseph D. Pape
*Assistant Examiner* — Dana D Ivey
(74) *Attorney, Agent, or Firm* — Vichit Chea King & Schickli, PLLC

(57) ABSTRACT

A vehicle trim panel retainer is provided. A vehicle door inner includes a bracket for extending into the interior passage, the bracket including an opening. A trim panel includes a house having an interior passage. The house further includes at least one projection for cooperating with the opening in a deployed position to assist in preventing the trim panel from releasing from the door inner. A second projection may also be provided for engaging the bracket in a deployed position.

21 Claims, 4 Drawing Sheets

VEHICLE TRIM PANEL RETAINER

TECHNICAL FIELD

This document relates generally to the motor vehicle field and, more particularly, to a vehicle trim panel retainer.

BACKGROUND

Vehicle doors are typically constructed of two or more panels attached to a door frame, including a sheet metal outer panel that defines the door exterior and a sheet metal inner panel secured to the door frame. Various door components are affixed to the door frame, including a window and window regulator, audio speakers, door locks, latches, and the like. A trim panel is fastened to the inner door panel to present an aesthetically pleasing appearance in the occupant compartment and to hide the internal components of the door assembly.

A side impact collision may cause localized deformation of the door, forcing the door and/or trim panel to move uncontrollably into the occupant seating area, which may be undesirable. To address this issue, a proposal is made in U.S. Pat. No. 8,733,820 (the disclosure of which is incorporated by reference) for a trim panel retention assembly. While this assembly addresses the issue noted above, it is not without limitations. For instance, it requires that the trim panel be received within the door inner, which may make it more difficult to assemble the parts during manufacture of the vehicle door.

Accordingly, a need is identified for an improved vehicle trim panel retainer.

SUMMARY

According to one aspect of the disclosure, a vehicle trim panel retainer is provided. The retainer comprises a vehicle door inner including a bracket having an opening. A trim panel includes a house having an interior passage for receiving the bracket. The house is adapted for cooperating with the bracket to provide the trim panel with compliance relative to the door inner while assisting in preventing the trim panel from releasing from the door inner.

In one embodiment, the first projection is located along the interior passage for passing into the opening in the deployed position. The house may further include a second projection for passing into the opening in a deployed position of the second projection. The first and second projections may be tabs provided on opposing walls of the house, the opposing walls bounding the passage. The first projection may project toward the door inner and the second projection may project away from the door inner.

According to another aspect of the disclosure, a vehicle trim panel retainer includes a vehicle door inner including a bracket. A trim panel includes a portion in which the bracket is received. The portion includes a first projection for moving from a home position spaced from the bracket to a deployed position cooperating with the bracket to assist in preventing the trim panel from releasing from the door inner.

In one embodiment, the bracket comprises an opening, and the first projection is adapted for passing into the opening in the deployed position. The house may further include a second projection for passing into the opening in a deployed position of the second projection. The portion of the trim panel may include a house for receiving the bracket.

According to yet another aspect of the disclosure, a vehicle trim panel retainer includes a vehicle door inner including a bracket having at least one opening. A trim panel includes a first projection spaced from the at least one opening in a home condition and extending into the at least one opening in a deployed position. In the deployed position, the tab thus assists in preventing the trim panel from releasing from the vehicle door inner.

In one embodiment, the trim panel includes a second projection for extending into the opening in a deployed position of the second projection. A house may be connected to the trim panel for receiving a portion of the bracket including the at least one opening. The house may include the first projection, as well as a second projection for extending into the opening of the bracket, and wherein the first and second projections are provided on opposing walls of the house. The first projection may project toward the door inner and the second projection projects away from the door inner.

In the following description, one or more embodiments of a vehicle trim panel retainer are shown and described. As it should be realized, the vehicle trim panel retainer is capable of other, different embodiments and its several details are capable of modification in various, obvious aspects all without departing from the vehicle trim panel retainer, as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the disclosed vehicle trim panel retainer, serve to explain certain principles thereof. In the drawing figures.

Reference will now be made in detail to the present preferred embodiments of the disclosed vehicle trim panel retainer, examples of which are illustrated in the accompanying drawing figures.

DETAILED DESCRIPTION

Figure 1:
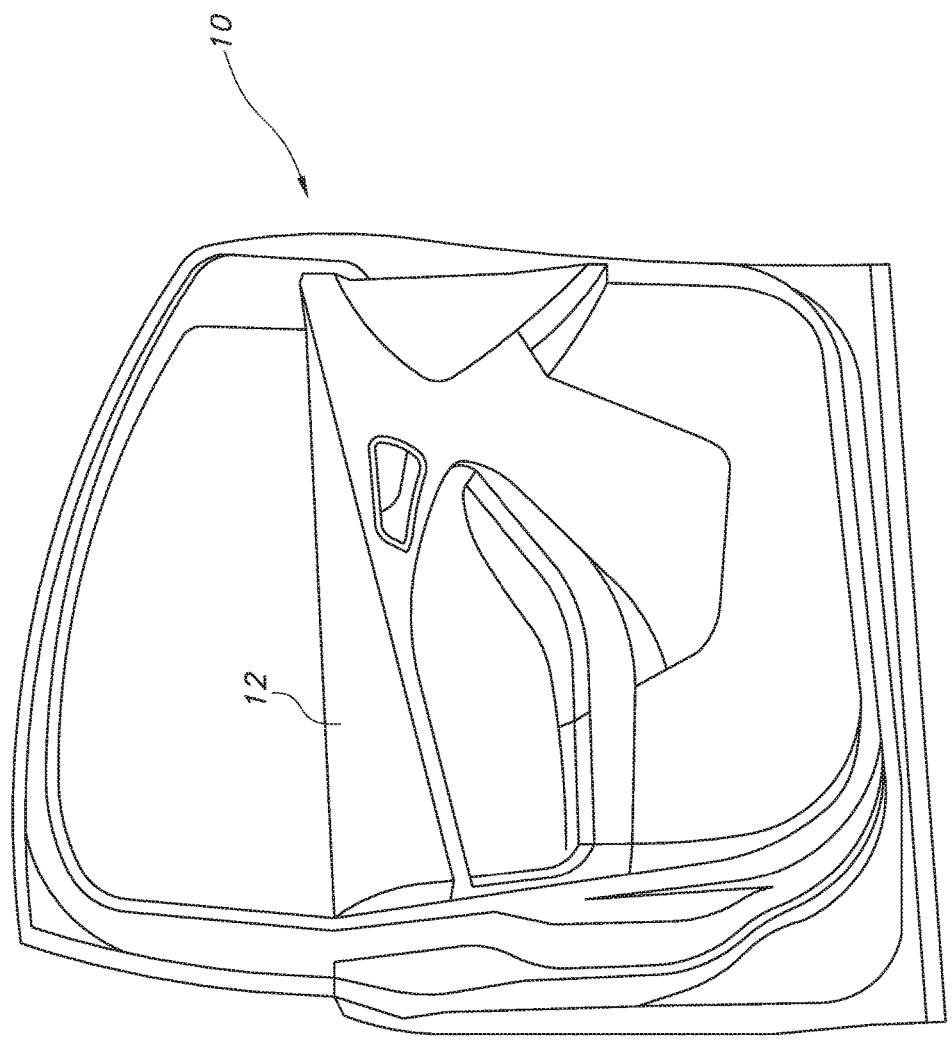
FIG. 1 is a perspective view of a vehicle door including a trim panel.

Reference is now made to FIG. 1, which illustrates a vehicle door 10 including a trim panel 12. The trim panel 12 may be positioned for serving as aesthetic covering, as well as possibly an arm rest, for the door 10, as shown, but could also be used in connection with other trim panels, without limitation. Conventional fasteners, such as screws or clips (not shown) may be provided at strategic locations for ensuring that the trim panel 12 is securely, but releasably, connected to the door 10.

Figure 3:
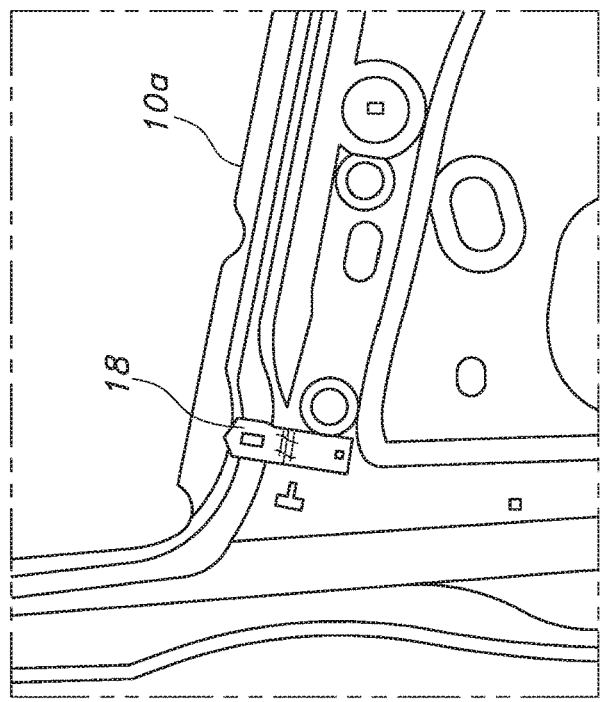
FIG. 3 is a partially cutaway perspective view of a bracket forming part of the retainer connected to the door inner.
Figure 2:
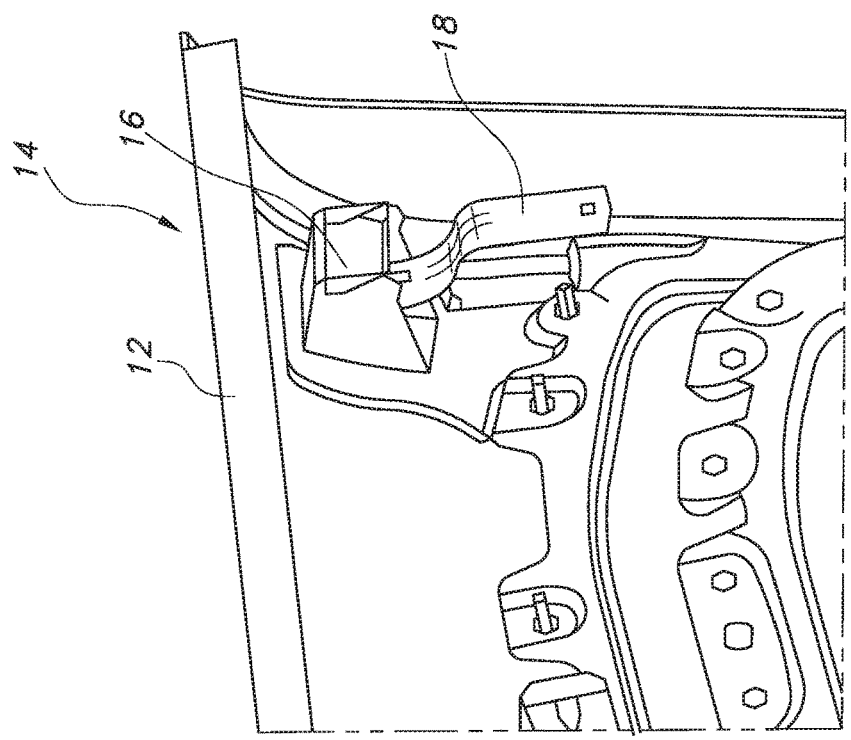
FIG. 2 is a partially cutaway view of the interior of the trim panel, showing the retainer.
Figure 4:
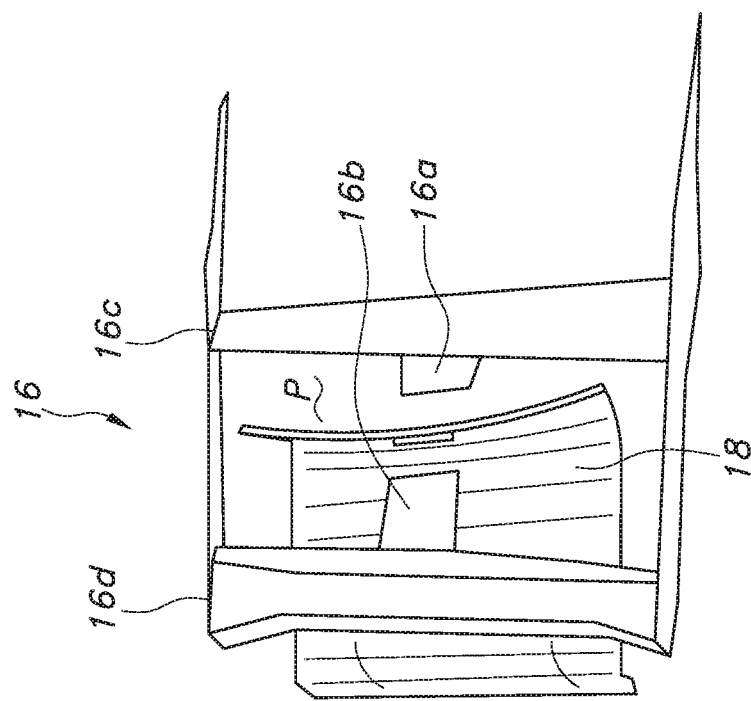
FIG. 4 is a plan view of the retainer without the door inner or trim panel.
Figure 5:
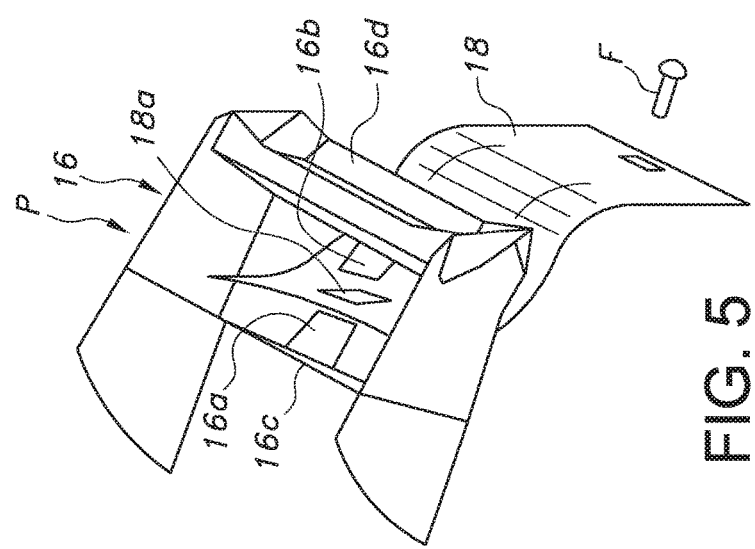
FIG. 5 is a perspective view of the arrangement of FIG. 4.

According to one aspect of the disclosure, and with reference to FIGS. 2-5, a retainer 14 is provided for assisting in retaining the trim panel 12 to the door 10 in the event of a side-impact thereon, but without inhibiting compliance during such an event, such as for permitting airbag deployment. In the illustrated embodiment, the retainer 14 comprises a house 16 connected to the trim panel 12, such as by fasteners, welding, or the like. The house 16 includes an interior passage P for receiving a portion of a bracket 18, which is secured to the door inner 10a is a similar manner (such as by a fastener F, as shown in FIG. 5).

As perhaps best understood by viewing FIG. 4, the passage P in the house 16 is oversized relative to the bracket 18, such that the two structures are spaced apart in a home or nominal condition (which facilitates ease of assembly, and avoids the need for extraneous fasteners). The house 16 further includes one or more projections, such as two tabs 16a, 16b for engaging the bracket 18 in a deployed position. Specifically, the house 16 may comprise spaced sidewalls 16c, 16d extending generally parallel to a plane of the door 10, each of which supports one of the tabs 16a, 16b in an opposed fashion. Consequently, it can be appreciated that one of the tabs 16a extends towards the door inner 10a, or opposite the vehicle cabin, and the other tab 16b extends away from the door inner, or towards the vehicle cabin.

Figure 3A:
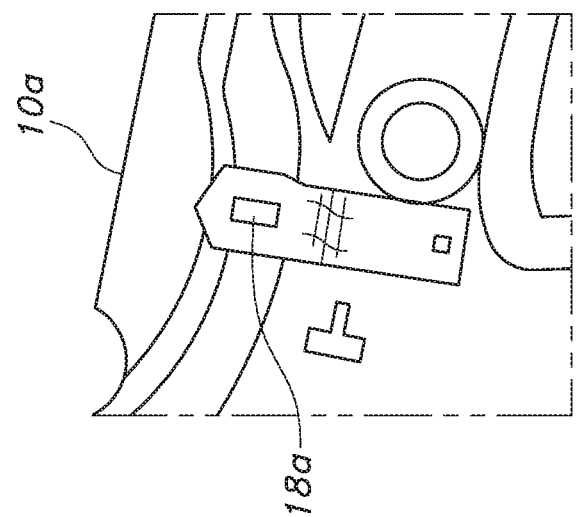
FIG. 3a is an enlarged view of FIG. 3.

As perhaps best understood from FIGS. 3 and 3A, the bracket 18 includes an opening, such as a slot 18a. The tabs 16a, 16b are sized and shaped for passing into this slot 18a. As can be appreciated, the arrangement as illustrated is such that the tabs 16a, 16b may pass into the slot 18a such that lateral and vertical movement of the trim panel 12 relative to the door 10 is restricted (at least to an extent), but relative movement in the direction D of entry or exit is entirely free or unrestricted. In this manner, a limited interlocking arrangement is provided.

Figure 6:
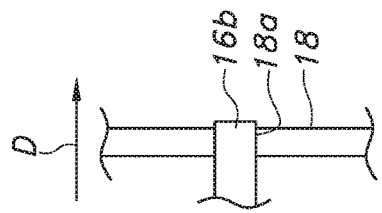
FIG. 6 is a schematic plan view of the retainer in a first deployed condition.
Figure 7:
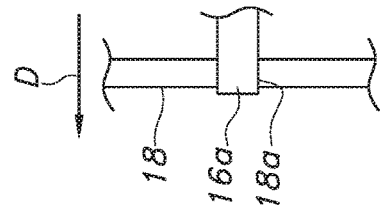
FIG. 7 is a schematic plan view of the retainer in a second deployed condition.

In the event of a side impact associated with the door 10, one or both of the tabs 16a, 16b may enter the slot 18a and thus assist in preventing the release of the trim panel 12 from the door inner 10a as a result of the cooperation. Specifically, in the event of an external impact, either or both of the tabs 16a, 16b may be forced to enter the slot 18a and thus establish a cooperating engagement between the house 16 and the bracket 18, as indicated in FIGS. 6 and 7. As can be appreciated, this arrangement does not inhibit the compliance of the trim panel 12 in terms of a resulting interior impact, such as by a vehicle driver or passenger, since the innermost tab 16a is free to move in a corresponding direction D, as indicated. Furthermore, it does not interfere with the ability of the trim panel 12 to move outwardly into the cabin in the event of the deployment of an associated airbag between the panel and the door inner 10a.

In summary, an improved retainer 14 for a vehicle door trim panel 12 is provided. The retainer 14 includes a house 16 for connecting with the trim panel 12 that receives a bracket 18 associated with the door inner 10a in a spaced relationship. As a result of a side impact (either from the inside or the outside of the door 10), projections in the form of tabs 16a, 16b may deploy to enter an opening or slot 18a in the bracket 18 to establish an engagement that does not impede the compliance of the trim panel 12, yet assists in preventing unintended release. Ease of manufacturing is also established by the arrangement, since the bracket 18 may be easily and freely inserted into the house 16 without complication, and without the need for additional or complicated fasteners.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A vehicle trim panel retainer, comprising:
a vehicle door inner including a bracket; and
a trim panel including a house having a plurality of sidewalls forming a passage, the bracket extending into the passage and spaced from the sidewalls to provide the trim panel with compliance relative to the door inner during a side impact while assisting in preventing the trim panel from releasing from the door inner during the side impact.

2. The retainer of claim 1, wherein the bracket includes an opening, and the house includes a first sidewall adjacent to the vehicle door inner and a second sidewall spaced from the first sidewall in a direction extending toward the trim panel, at least one of the first and second sidewalls supporting a first projection for cooperating with the opening in a deployed position.

3. The retainer of claim 2, wherein the first projection is located along the passage of the house and adapted for passing into the opening in the deployed position.

4. The retainer of claim 2, wherein the house includes a second projection on another of the first and second sidewalls for passing into the opening in a deployed position of the second projection.

5. The retainer of claim 4, wherein the first and second projections are positioned on opposing walls of the house, the opposing walls bounding the interior passage.

6. The retainer of claim 4, wherein the first projection projects toward the door inner and the second projection projects away from the door inner.

7. The retainer of claim 4, wherein the first and second projections comprise opposed tabs on the first and second sidewalls of the house.

8. The retainer of claim 1, further including a fastener for securing the bracket to the vehicle door inner.

9. A vehicle including the vehicle trim panel retainer of claim 1.

10. A vehicle trim panel retainer, comprising:
a vehicle door inner including a bracket; and
a trim panel including a portion in which the bracket is received, the portion including a first projection for moving from a home position spaced from the bracket to a deployed position cooperating with the bracket to assist in preventing the trim panel from releasing from the door inner, wherein the bracket comprises an opening, and the first projection is adapted for passing into the opening in the deployed position.

11. The retainer of claim 10, wherein the portion includes a second projection for passing into the opening in a deployed position of the second projection.

12. The retainer of claim 10, wherein the portion of the trim panel comprises a house for receiving the bracket the house including a plurality of sidewalls surrounding a portion of the bracket.

13. A vehicle including the vehicle trim panel retainer of claim 10.

14. A vehicle trim panel retainer, comprising:
a vehicle door inner including a bracket having at least one opening; and
a trim panel including a first projection spaced from the at least one opening in a home condition and extending into the at least one opening in a deployed position to assist in preventing the trim panel from releasing from the vehicle door inner.

15. The retainer of claim 14, wherein the trim panel includes a second projection for extending into the at least one opening in a deployed position of the second projection.

16. The retainer of claim 14, further including a house connected to the trim panel for receiving a portion of the bracket including the at least one opening.

17. The retainer of claim 16, wherein the house includes the first projection.

18. The retainer of claim 17, wherein the house includes a second projection for extending into the opening of the bracket, and wherein the first projection projects toward the door inner and the second projection projects away from the door inner.

19. A vehicle including the vehicle trim panel retainer of claim 14.

20. A vehicle trim panel retainer, comprising:
a vehicle door inner including a bracket; and
a trim panel including a portion in which the bracket is received, the portion including a first projection for moving from a home position spaced from the bracket to a deployed position cooperating with the bracket to assist in preventing the trim panel from releasing from the door inner, wherein the portion includes a second projection for passing into the opening in a deployed position of the second projection.

21. A vehicle trim panel retainer, comprising:
a vehicle door inner including a bracket; and
a trim panel including a portion in which the bracket is received, the portion including a first projection for moving from a home position spaced from the bracket to a deployed position cooperating with the bracket to assist in preventing the trim panel from releasing from the door inner, wherein the portion of the trim panel comprises a house for receiving the bracket, the house including a plurality of sidewalls surrounding a portion of the bracket.

* * * * *